Aug. 9, 1927.

R. DE COURSEULLES 1,638,435

FLUIDTIGHT ARRANGEMENT FOR CANNON MOUNTED IN FLUIDTIGHT
TURRETS UPON SUBMARINE VESSELS
Filed July 14, 1926      2 Sheets-Sheet 1

R. De Courseulles
Inventor

By: Marks & Clerk
Attys.

Aug. 9, 1927. 1,638,435
R. DE COURSEULLES
FLUIDTIGHT ARRANGEMENT FOR CANNON MOUNTED IN FLUIDTIGHT
TURRETS UPON SUBMARINE VESSELS
Filed July 14, 1926 2 Sheets-Sheet 2
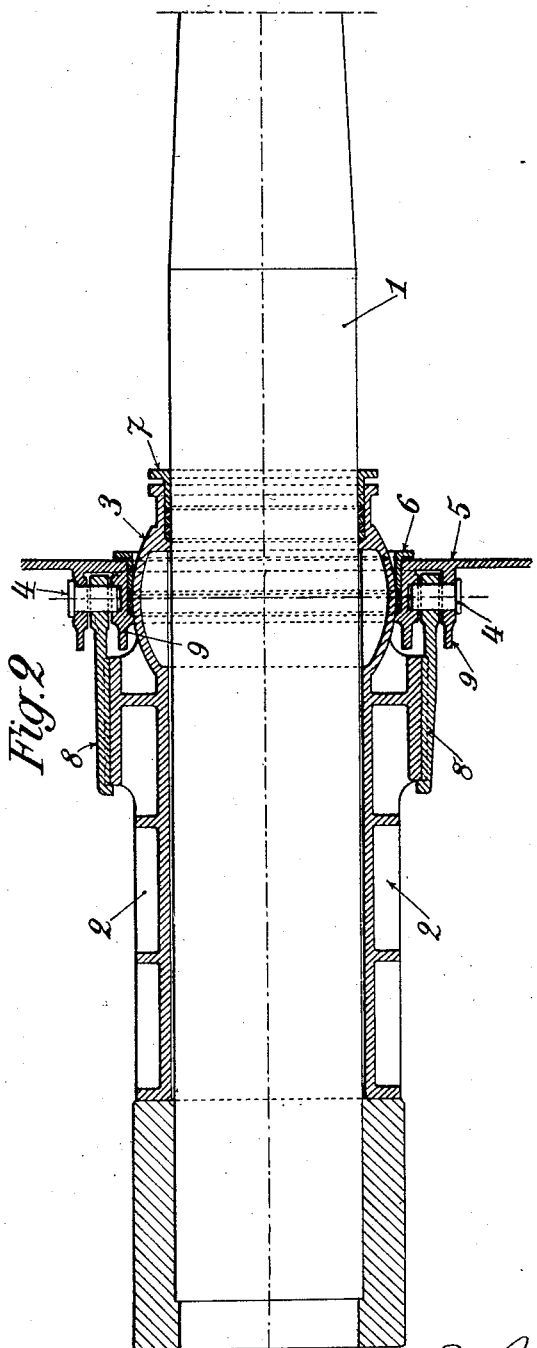
De Courseulles
inventor
By Marks & Clerk
Attys.

Patented Aug. 9, 1927.

1,638,435

UNITED STATES PATENT OFFICE.

ROBERT DE COURSEULLES, OF PARIS, FRANCE, ASSIGNOR TO SOCIETE SCHNEIDER & CIE., AND COMPAGNIE DES FORGES ET ACIERIES DE LA MARINE ET D'HOMECOURT, BOTH OF PARIS, FRANCE.

FLUID-TIGHT ARRANGEMENT FOR CANNON MOUNTED IN FLUID-TIGHT TURRETS UPON SUBMARINE VESSELS.

Application filed July 14, 1926, Serial No, 122,474, and in France July 15, 1925.

The present invention relates to an arrangement for the fluidtight turrets of submarine vessels which assures fluidtight conditions between the cannon and the walls of the said turrets.

It has already been made use of ball members of small size with an external joint made with the aid of a stuffing-box and according to a large circle of the sphere. With these known devices, the pivoting of the oscillating mass (cannon and cradle) was exclusively obtained by the displacements of the ball in its recess. It results therefrom that, during firing, the ball had to support the whole of the stresses, and at same time, the weight of the oscillating mass. The fact that the ball supported the weight of the oscillating mass rendered the aiming more difficult and exposed the walls of the recess or ball socket to an exaggerated wear, whereby a lack of tightness rapidly occurred.

On the other hand, one has proposed the use of balls of large size in combination with a cradle pivoting in a carriage, the trunnions being arranged according to the horizontal axis of the sphere at right angle with the axis of the cannon. In this case, practically, that is to say when it is desired to avoid a projection of the ball member and a corresponding recess, the tight joint upon the ball can be made only according to a small circle of the sphere and with another means than a usual stuffing-box.

The invention allows to do away with the disadvantages of the one and the other of the known devices.

To this purpose, it comprises, in the known manner, a ball of a small diameter with external joint by means of a stuffing box, disposed according to a large circle. The new device is essentially characterized by the fact that the ball-carrying cradle is mounted upon trunnions whose axis corresponds of course with the horizontal axis of the ball, but which are arranged externally to the latter and capable of moving in bearing forming an internal projection upon the walls of the chamber or recess. There are these trunnions which support the stresses due to the firing as well as those which are due to the weight of the oscillating mass, the ball member is thus released and the aiming as well as the maintenance of a fluidtight joint are considerably facilitated.

The appended drawings show by way of example an embodiment of the invention.

Fig. 2 is a horizontal section on the axis of the cannon, which is supposed to be in the horizontal position.

Figure 1:
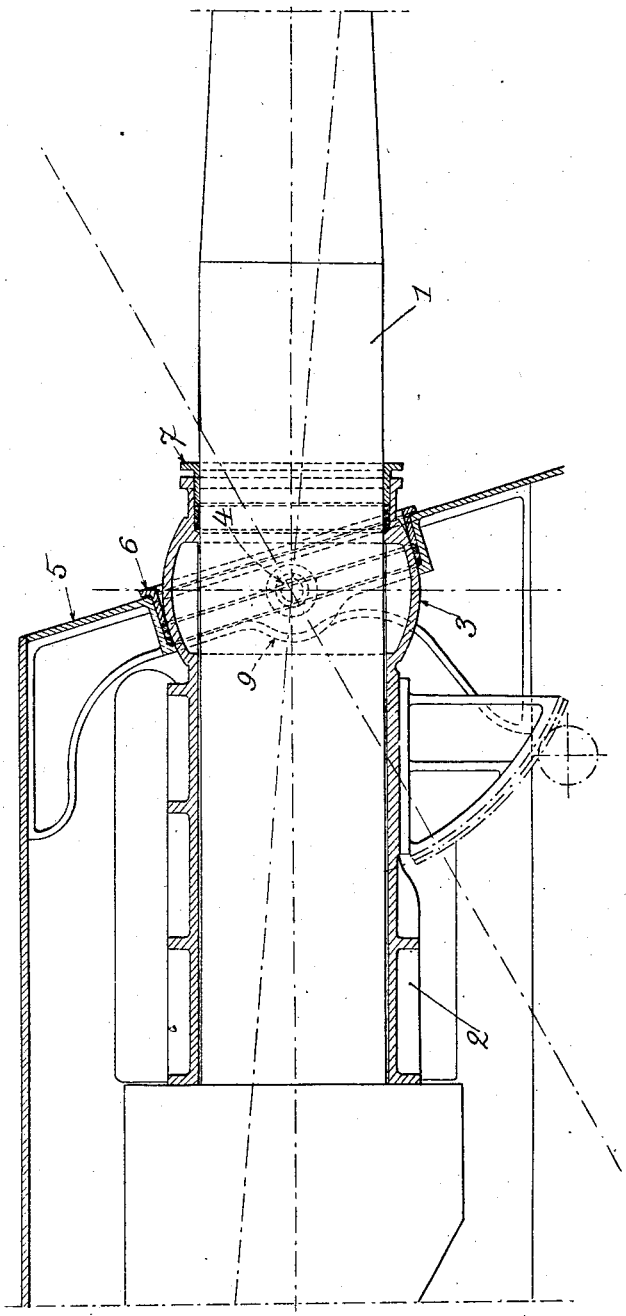
Fig. 1 is a vertical section on the axis of one of the cannons of the turret.

The cannon 1 is mounted on a cradle 2 which comprises the usual devices for the recoil and for the return to battery. The front part of the cradle has the form of a ball member 3 whose centre is situated upon the axis of the trunnions 4 which are placed on either side of the said member.

The recess formed in the wall 5 of the turret for the insertion of the ball 3 comprises a circular stuffing box 6 providing for a fluidtight joint between the said wall and the ball member, and so arranged that the cannon can be properly aimed.

Another stuffing box 7 which is disposed upon the cradle 2 in front of the ball 3, assures a fluidtight joint between the cradle and the cannon, while providing for the recoil of the cannon.

The trunnions 4 are engaged in the clamps 8 which are secured laterally to the cradle 2, and are supported by the lugs 9 formed in one with the wall 5 and secured to the frame of the turret.

A certain play, which has the minimum value, is allowed between the ball 3 and the metallic part of its recess, so that the stresses due to the firing and to the weight of the device will be brought upon the trunnions 4 and not upon the said ball.

Having thus described my apparatus, what I claim as new therein, and my own invention, is:

1. In an artillery installation for submarine vessels, a cannon tube, a cradle in which said tube is slidable, a turret and a circular socket in the said turret, a ball which is connected with the said cradle, trunnions for the cradle which are disposed externally to the ball according to a diameter of the latter, bearings for these trunnions internally projecting from the wall of the turret.

2. In an artillery installation for submarine vessels, a cannon tube, a cradle in which said tube is slidable, a turret, and a circular socket in the said turret, a ball connected with said cradle and engaged in said socket, trunnions for the cradle which are disposed externally to the ball according to a diameter of the latter, bearings for these trunnions internally projecting from the wall of the turret, a packing joint between the ball and the wall of the turret and disposed according to a large circle of said ball.

In testimony whereof I have hereunto affixed my signature.

ROBERT DE COURSEULLES.